(12) United States Patent
Mekis et al.

(10) Patent No.: US 10,222,637 B2
(45) Date of Patent: Mar. 5, 2019

(54) METHOD AND SYSTEM FOR INTEGRATED POWER COMBINERS

(71) Applicant: Luxtera, Inc., Carlsbad, CA (US)

(72) Inventors: Attila Mekis, Carlsbad, CA (US); Adithyaram Narasimha, Carlsbad, CA (US); Jeremy Witzens, Köln (DE)

(73) Assignee: Luxtera, Inc., Carlsbad, CA (US)

( * ) Notice: Subject to any disclaimer, the term of this patent is extended or adjusted under 35 U.S.C. 154(b) by 0 days.

(21) Appl. No.: 15/812,517

(22) Filed: Nov. 14, 2017

(65) Prior Publication Data

US 2018/0067342 A1 Mar. 8, 2018

Related U.S. Application Data

(60) Continuation of application No. 15/231,356, filed on Aug. 8, 2016, now Pat. No. 9,823,495, which is a (Continued)

(51) Int. Cl.
*G02B 6/27* (2006.01)
*G02F 1/01* (2006.01)
(Continued)

(52) U.S. Cl.
CPC ........... *G02F 1/0136* (2013.01); *G02B 6/125* (2013.01); *G02B 6/126* (2013.01); *G02B 6/2726* (2013.01);
(Continued)

(58) Field of Classification Search
CPC .................................................. G02F 1/0136
See application file for complete search history.

(56) References Cited

U.S. PATENT DOCUMENTS

| | | | |
|---|---|---|---|
| 5,111,517 A | 5/1992 | Riviere | |
| 5,654,818 A * | 8/1997 | Yao | ........................ G02F 1/035 359/246 |

(Continued)

OTHER PUBLICATIONS

Hirohito Yamada, Michinao Nozawa, Masao Kinoshita, and Keishi Ohashi, "Vertical-coupling optical interface for on-chip optical interconnection," Opt. Express 19, 698-703 (2011).*

(Continued)

*Primary Examiner* — Rhonda S Peace
(74) *Attorney, Agent, or Firm* — McAndrews, Held & Malloy

(57) ABSTRACT

A system for integrated power combiners is disclosed and may include receiving optical signals in input optical waveguides and phase-modulating the signals to configure a phase offset between signals received at a first optical coupler, where the first optical coupler may generate output signals having substantially equal optical powers. Output signals of the first optical coupler may be phase-modulated to configure a phase offset between signals received at a second optical coupler, which may generate an output signal having an optical power of essentially zero and a second output signal having a maximized optical power. Optical signals received by the input optical waveguides may be generated utilizing a polarization-splitting grating coupler to enable polarization-insensitive combining of optical signals. Optical power may be monitored using optical detectors. The monitoring of optical power may be used to determine a desired phase offset between the signals received at the first optical coupler.

20 Claims, 13 Drawing Sheets

Related U.S. Application Data continuation of application No. 14/149,626, filed on Jan. 7, 2014, now Pat. No. 9,417,466, which is a division of application No. 13/157,642, filed on Jun. 10, 2011, now Pat. No. 8,625,935.

(60) Provisional application No. 61/397,738, filed on Jun. 15, 2010.

(51) Int. Cl.
*G02B 6/293* (2006.01)
*G02F 1/035* (2006.01)
*G02F 1/313* (2006.01)
*G02B 6/126* (2006.01)
*G02B 6/125* (2006.01)
*G02B 6/42* (2006.01)
*G02B 6/34* (2006.01)
*G02B 6/12* (2006.01)

(52) U.S. Cl.
CPC ....... *G02B 6/2773* (2013.01); *G02B 6/29344* (2013.01); *G02B 6/34* (2013.01); *G02B 6/4286* (2013.01); *G02F 1/011* (2013.01); *G02F 1/313* (2013.01); *G02B 2006/12142* (2013.01)

(56) References Cited

U.S. PATENT DOCUMENTS

| | | | |
|---|---|---|---|
| 6,175,668 B1* | 1/2001 | Borrelli | G02B 6/126 359/484.03 |
| 6,212,315 B1 | 4/2001 | Doerr | |
| 6,493,473 B1* | 12/2002 | Wooten | G02F 1/0136 359/246 |
| 6,539,131 B1 | 3/2003 | Gill et al. | |
| 6,650,458 B1* | 11/2003 | Prosyk | G02F 1/225 359/237 |
| 6,751,002 B2 | 6/2004 | Ovadia | |
| 7,245,803 B2* | 7/2007 | Gunn, III | G02B 6/1228 359/574 |
| 7,822,298 B2* | 10/2010 | Rasras | G02B 6/126 385/1 |
| 7,916,377 B2* | 3/2011 | Witzens | G02F 1/0123 359/239 |
| 8,238,014 B2* | 8/2012 | Kucharski | G02F 1/225 359/238 |
| 8,280,207 B2* | 10/2012 | Pinguet | G02B 6/124 385/37 |
| 8,401,399 B2 | 3/2013 | Barton | |
| 8,433,162 B2* | 4/2013 | Pinguet | G02B 6/124 385/37 |
| 8,625,935 B2* | 1/2014 | Mekis | G02F 1/313 385/3 |
| 8,649,639 B2 | 2/2014 | Mekis et al. | |
| 8,798,476 B2 | 8/2014 | Gloeckner | |
| 8,861,906 B2* | 10/2014 | Pinguet | G02B 6/124 385/37 |
| 8,923,664 B2* | 12/2014 | Mekis | G02B 6/43 385/12 |
| 9,244,227 B2* | 1/2016 | Xu | G02B 6/34 |
| 9,417,466 B2 | 8/2016 | Mekis | |
| 2003/0039461 A1 | 2/2003 | How Kee Chun et al. | |
| 2003/0235370 A1* | 12/2003 | Taillaert | B82Y 20/00 385/50 |
| 2004/0184156 A1* | 9/2004 | Gunn, III | G02B 6/1228 359/629 |
| 2009/0022500 A1* | 1/2009 | Pinguet | G02B 6/1228 398/164 |
| 2010/0128336 A1* | 5/2010 | Witzens | G02F 1/0123 359/239 |
| 2010/0209114 A1 | 8/2010 | Gloeckner et al. | |
| 2011/0217002 A1 | 9/2011 | Mekis et al. | |
| 2011/0305414 A1* | 12/2011 | Mekis | G02F 1/313 385/3 |
| 2012/0002971 A1* | 1/2012 | Doerr | G02B 6/124 398/115 |
| 2014/0010498 A1* | 1/2014 | Verslegers | G02B 5/1861 385/37 |
| 2014/0126856 A1* | 5/2014 | Mekis | G02F 1/313 385/3 |
| 2014/0169740 A1* | 6/2014 | Verslegers | G02B 6/122 385/42 |
| 2015/0028192 A1* | 1/2015 | Pinguet | G02B 6/124 250/208.2 |
| 2015/0219847 A1* | 8/2015 | Mack | G02B 6/4286 385/14 |
| 2015/0286004 A1* | 10/2015 | Mekis | G02B 6/2808 398/141 |
| 2016/0313505 A1 | 10/2016 | Ma | |
| 2017/0357066 A1* | 12/2017 | Mack | G02B 6/4286 |

OTHER PUBLICATIONS

D. Taillaert, Harold Chong, P. I. Borel, L. H. Frandsen, R. M. De La Rue and R. Baets, "A compact two-dimensional grating coupler used as a polarization splitter," in IEEE Photonics Technology Letters, vol. 15, No. 9, pp. 1249-1251, Sep. 2003.*

* cited by examiner

METHOD AND SYSTEM FOR INTEGRATED POWER COMBINERS

CROSS-REFERENCE TO RELATED APPLICATIONS/INCORPORATION BY REFERENCE

This application is a continuation of application Ser. No. 15/231,356 filed on Aug. 8, 2016, which is a continuation of application Ser. No. 14/149,626 filed on Jan. 17, 2014, now U.S. Pat. No. 9,417,466, which is a divisional application of application Ser. No. 13/157,642 filed on Jun. 10, 2011, now U.S. Pat. No. 8,625,935, which makes reference to and claims priority to U.S. Provisional Application Ser. No. 61/397,738 filed on Jun. 15, 2010. Each of the above stated applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to signal processing. More specifically, certain embodiments of the invention relate to a method and system for integrated power combiners.

BACKGROUND OF THE INVENTION

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Optical communication systems have been widely adopted for applications ranging from internet backbone, local area networks, data centers, supercomputing, to high-definition video. Due to superior bandwidth and low loss, optical fibers are the medium of choice for transporting high-speed binary data.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for integrated power combiners, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a system for integrated power combiners. Exemplary aspects of the invention may comprise a chip comprising an optical power combiner in a photonic circuit, where the optical power combiner comprises input optical waveguides, optical couplers, and output optical waveguides. Optical signals may be received in each of the input optical waveguides and phase-modulated to configure a phase offset between signals received at a first optical coupler, wherein the first optical coupler may generate output signals with substantially equal optical powers. One or both output signals of the first optical coupler may be phase-modulated to configure a phase offset between signals received at a second optical coupler. The second optical coupler generates an output signal in a first of the output optical waveguides having an optical power of essentially zero and an output signal in a second of the output optical waveguides having a maximized optical power. The optical couplers may comprise, for example, directional couplers, and the chip may comprise, for example, a CMOS chip. Optical signals received by the input optical waveguides may be generated utilizing a polarization-splitting grating coupler, wherein the polarization splitting grating coupler enables polarization-insensitive combining of optical signals utilizing the optical power combiner. Optical power in waveguides coupling the optical couplers may be monitored using optical detectors. The monitoring of optical power may be used to determine a desired phase offset between the signals received at the first optical coupler, and optical signals may be communicated to the optical detectors utilizing optical taps in the coupling waveguides.

Figure 1A:
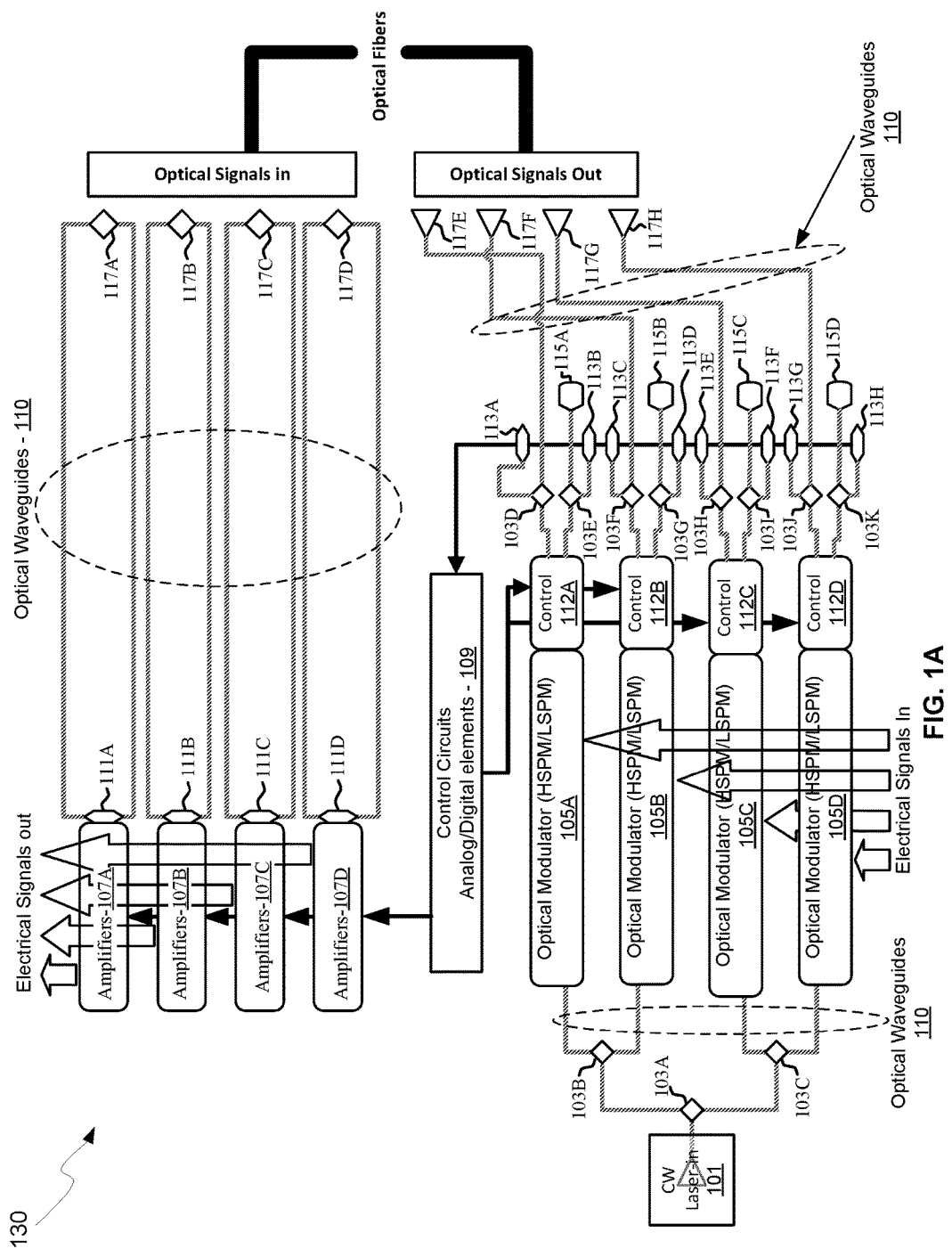
FIG. 1A is a block diagram of a photonically enabled CMOS chip comprising integrated power combiners, in accordance with an embodiment of the invention.

FIG. 1A is a block diagram of a photonically enabled CMOS chip comprising integrated power combiners, in accordance with an embodiment of the invention. Referring to FIG. 1A, there is shown optoelectronic devices on a CMOS chip 130 comprising optical modulators 105A-105D, photodiodes 111A-111D, monitor photodiodes 113A-113H, and optical devices comprising taps 103A-103K, optical terminations 115A-115D, and grating couplers 117A-117H. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example.

Optical signals are communicated between optical and optoelectronic devices via optical waveguides 110 fabricated in the CMOS chip 130, Single-mode or multi-mode waveguides may be used in photonic integrated circuits. Single-mode operation enables direct connection to optical signal processing and networking elements. The term "single-mode" may be used for waveguides that support a single mode for each of the two polarizations, transverse-electric (TE) and transverse-magnetic (TM), or for waveguides that are truly single mode and only support one mode whose polarization is TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab.

The optical modulators 105A-105D, comprise Mach-Zehnder or ring modulators, for example, and enable the modulation of the continuous-wave (CW) laser input signal. The optical modulators 105A-105D, comprise high-speed and low-speed phase modulation sections and are controlled by the control sections 112A-112D. The high-speed phase modulation section of the optical modulators 105A-105D, may modulate a CW light source signal with a data signal. The low-speed phase modulation section of the optical modulators 105A-105D, may compensate for slowly varying phase factors such as those induced by mismatch between the waveguides, waveguide temperature, or waveguide stress and is referred to as the passive phase, or the passive biasing of the MZI.

The phase modulators may have a dual role: to compensate for the passive biasing of the MZI and to apply the additional phase modulation used to modulate the light intensity at the output port of the MZI according to a data stream. The former phase tuning and the latter phase modulation may be applied by separate, specialized devices, since the former is a low speed, slowly varying contribution, while the latter is typically a high speed signal. These devices are then respectively referred to as the LSPM and the HSPM. Examples for LSPM are thermal phase modulators (TPM), where a waveguide portion is locally heated up to modify the index of refraction of its constituting materials, or forward biased PIN junction phase modulators (PINPM) where current injection into the PIN junction modifies the carrier density, and thus the index of refraction of the semiconductor material. An example of an HSPM is a reversed biased PIN junction, where the index of refraction is also modulated via the carrier density, but which allows much faster operation, albeit at a lower phase modulation efficiency per waveguide length.

The outputs of the modulators 105A-105D, may be optically coupled via the waveguides 110 to the grating couplers 117E-117H. The taps 103D-103K comprise four-port optical couplers, for example, and are utilized to sample the optical signals generated by the optical modulators 105A-105D, with the sampled signals being measured by the monitor photodiodes 113A-113H. The unused branches of the taps 103D-103K are terminated by optical terminations 115A-115D to avoid back reflections of unwanted signals.

The grating couplers 117A-117H comprise optical gratings that enable coupling of light into and out of the CMOS chip 130. The grating couplers 117A-117D may be utilized to couple light received from optical fibers into the CMOS chip 130, and the grating couplers 117E-117H may be utilized to couple light from the CMOS chip 130 into optical fibers. The grating couplers 117A-117H may comprise single polarization grating couplers (SPGC) and/or polarization splitting grating couplers (PSGC). In instances where a PSGC is utilized, two input, or output, waveguides may be utilized.

The optical fibers may be epoxied, for example, to the CMOS chip, and may be aligned at an angle from normal to the surface of the CMOS chip 130 to optimize coupling efficiency. In an embodiment of the invention, the optical fibers may comprise single-mode fiber (SMF) and/or polarization-maintaining fiber (PMF).

In another exemplary embodiment, optical signals may be communicated directly into the surface of the CMOS chip 130 without optical fibers by directing a light source on an optical coupling device in the chip, such as the light source interface 135 and/or the optical fiber interface 139. This may be accomplished with directed laser sources and/or optical sources on another chip flip-chip bonded to the CMOS chip 130.

The photodiodes 111A-111D, may convert optical signals received from the grating couplers 117A-117D into electrical signals that are communicated to the amplifiers 107A-107D for processing. In another embodiment of the invention, the photodiodes 111A-111D, may comprise high-speed heterojunction phototransistors, for example, and may comprise germanium (Ge) in the collector and base regions for absorption in the 1.3-1.6 μm optical wavelength range, and may be integrated on a CMOS silicon-on-insulator (SOI) wafer.

The analog and digital control circuits 109 may control gain levels or other parameters in the operation of the amplifiers 107A-107D, which may then communicate electrical signals off the CMOS chip 130. The control sections 112A-112D comprise electronic circuitry that enable modulation of the CW laser signal received from the splitters 103A-103C. The optical modulators 105A-105D, may require high-speed electrical signals to modulate the refractive index in respective branches of a Mach-Zehnder interferometer (MZI), for example. In an embodiment of the invention, the control sections 112A-112D may include sink and/or source driver electronics that may enable a bidirectional link utilizing a single laser.

In operation, the CMOS chip 130 may be operable to transmit and/or receive and process optical signals. The grating couplers 117A-117D may be operable to receive optical signals from optical fibers coupled to the chip 130 and may convert the optical mode of the fiber into the much smaller mode of a Si waveguide fabricated on the CMOS SOI wafer. The grating couplers 117A-117D may comprise a single-polarization or a polarization-splitting type: in the first case, only a specific polarization is coupled to a single Si waveguide, while in the second case, two orthogonal polarizations are split into two output waveguides.

Integrated photonics platforms allow the full functionality of an optical transceiver to be integrated on a single chip, the CMOS chip 130, for example. A transceiver chip comprise opto-electronic circuits that create and process the optical/electrical signals on the transmitter (Tx) and the receiver (Rx) sides, as well as optical interfaces that couple the optical signal to and from one or more fiber. The signal processing functionality may comprise modulating the optical carrier, detecting the optical signal, splitting or combining data streams, and multiplexing or demultiplexing data on carriers with different wavelengths.

The light source may be external to the chip or may be integrated with the chip in a hybrid scheme. It is often advantageous to have an external continuous-wave (CW) light source, because this architecture allows heat sinking and temperature control of the source separately from the transceiver chip 130. An external light source may also be connected to the transceiver chip 130 via a fiber interface.

An integrated transceiver may comprise at least three optical interfaces, including a transmitter input port to interface to the CW light source, labeled as CW Laser In 101; a transmitter output port to interface to the fiber carrying the optical signal, labeled Optical Signals Out; and a receiver input port to interface to the fiber carrying the optical signal, labeled Optical Signals In.

Waveguide photodetectors may be incorporated in integrated optics platforms, where several components are integrated together on a single receiver chip, as illustrated in FIG. 1A. In this platform, light couplers, such as the optical couplers 117A-117D, couple the optical signal from the fiber into optical waveguides 110. The optical signal subsequently enters the waveguide detectors 111A-111D, where it is converted to an electrical signal. In some embodiments, the coupler may comprise a grating coupler, in which case the fiber is oriented in a near normal configuration to the chip 130 surface.

In instances where the fiber medium carries the signal in a single optical mode, the receiver subsystem on the chip, comprising the light coupler, the waveguide, and the waveguide detector, may be designed to support a single mode. Because the single-mode fiber mode has two polarization states, the term "single-mode waveguide" is used both for waveguides that support a single mode for each of the two polarizations (TE and TM) or for waveguides that only support one mode whose polarization is TE, with the electric field parallel to the substrate.

The fibers may be either single-mode fibers (SMFs), polarization-maintaining fibers (PMFs) or some other fiber type. To facilitate efficient optical signal processing, the waveguides carrying the signal on the transceiver chip 130 may support one mode with a single polarization. In contrast, the optical mode in SMFs has two orthogonal polarizations. Since the CW light source has a well-defined polarization, one option is to employ PMFs in order to retain a single polarization throughout the system. However, PMFs are costly and more difficult to align accurately than SMFs. For this reason, SMFs may be used in an optical interconnect, thereby requiring input ports to accept signals in arbitrary polarizations. A polarization splitting grating coupler (PSGC) may be used to generate two optical modes from a received input optical signal. In an exemplary embodiment of the invention, an optical power combiner may be utilized to efficiently combine optical signals of unknown phase and intensity generated by the PSGC.

In an exemplary embodiment of the invention, the integrated power may enable locating the CW laser source remotely, with the optical source signal communicated to the CMOS chip 130 via optical fiber, as opposed to mounting a laser in the laser module 147 directly over a grating coupler.

Figure 1B:
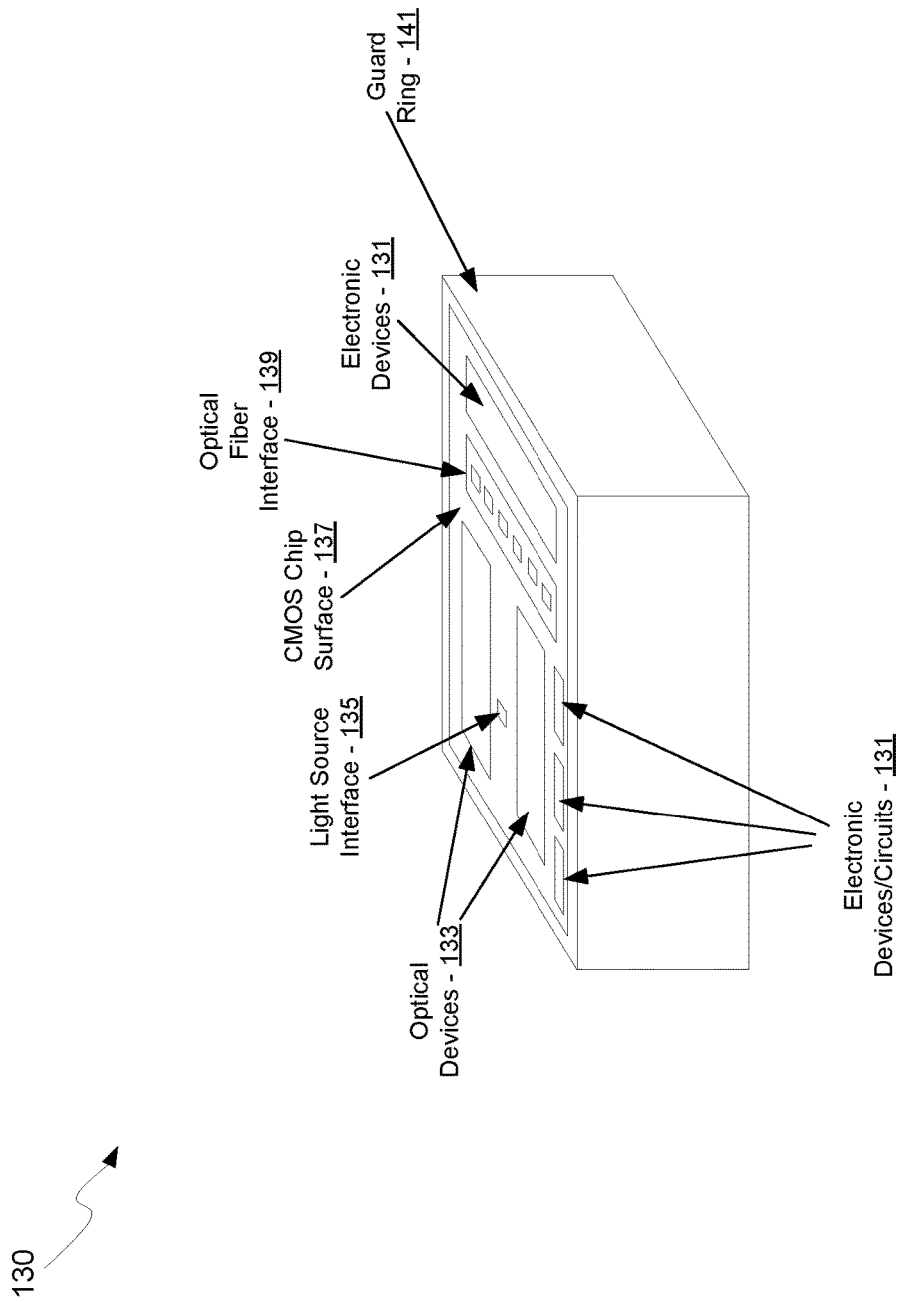
FIG. 1B is a diagram illustrating an exemplary CMOS chip, in accordance with an embodiment of the invention.

FIG. 1B is a diagram illustrating an exemplary CMOS chip, in accordance with an embodiment of the invention. Referring to FIG. 1B, there is shown the CMOS chip 130 comprising electronic devices/circuits 131, optical and optoelectronic devices 133, a light source interface 135, CMOS chip front surface 137, an optical fiber interface 139, and CMOS guard ring 141.

The light source interface 135 and the optical fiber interface 139 comprise grating couplers, for example, that enable coupling of light signals via the CMOS chip surface 137, as opposed to the edges of the chip as with conventional edge-emitting devices. Coupling light signals via the CMOS chip surface 137 enables the use of the CMOS guard ring 141 which protects the chip mechanically and prevents the entry of contaminants via the chip edge.

The electronic devices/circuits 131 comprise circuitry such as the amplifiers 107A-107D and the analog and digital control circuits 109 described with respect to FIG. 1A, for example. The optical and optoelectronic devices 133 comprise devices such as the taps 103A-103K, optical terminations 115A-115D, grating couplers 117A-117H, optical modulators 105A-105D, high-speed heterojunction photodiodes 111A-111D, and monitor photodiodes 113A-113H.

In an embodiment of the invention, the efficiency of receiver subsystems on the CMOS chip 130 may be increased by utilizing an optical power combiner to efficiently combine optical signals of unknown phase and intensity in the photonic circuits in the CMOS chip 130. Other embodiments of the invention comprise a power equalizer, a polarization-insensitive combiner, a polarization controller, and a polarization-insensitive splitter.

Figure 1C:
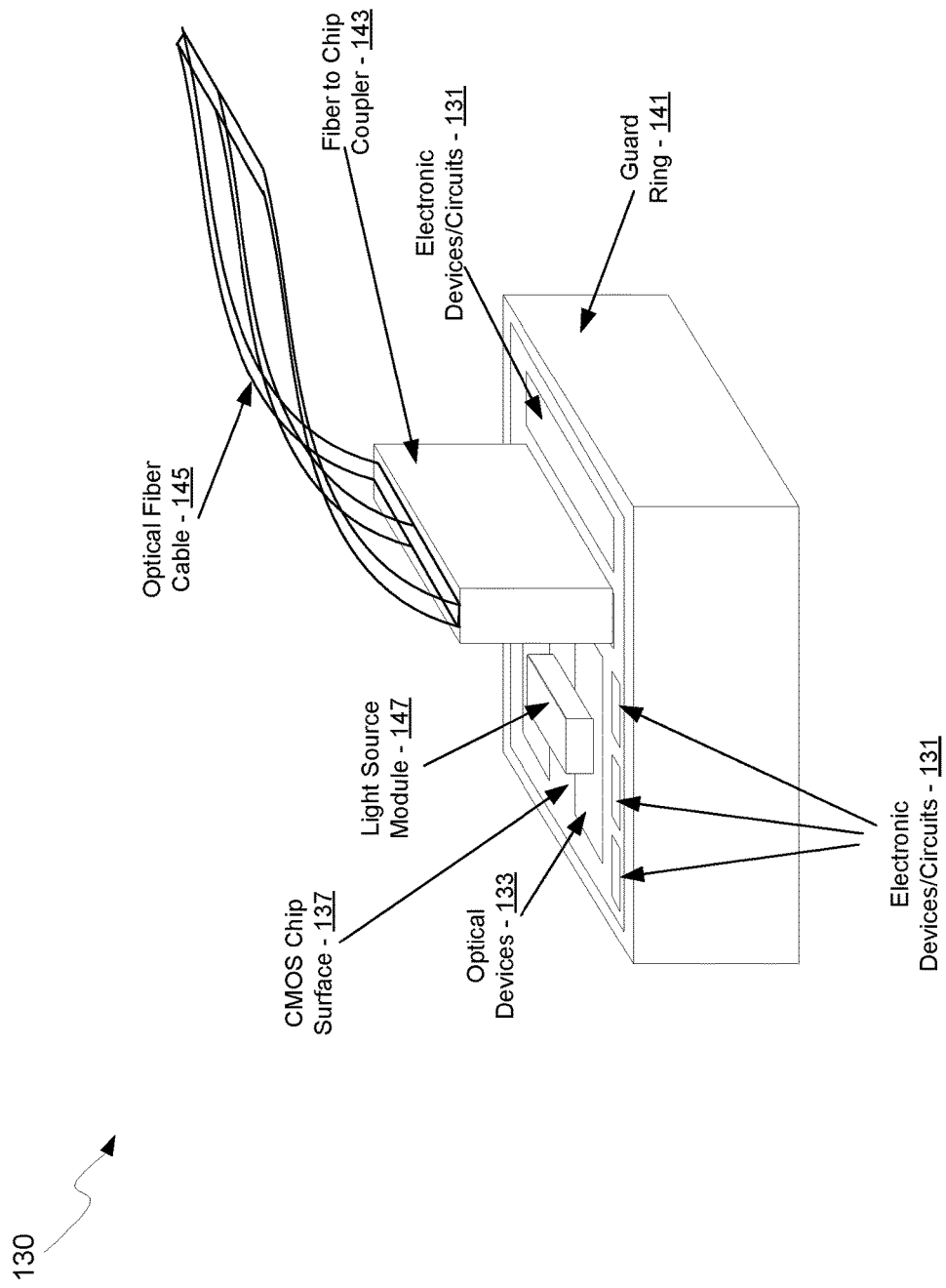
FIG. 1C is a diagram illustrating an exemplary CMOS chip coupled to an optical fiber cable, in accordance with an embodiment of the invention.

FIG. 1C is a diagram illustrating an exemplary CMOS chip coupled to an optical fiber cable, in accordance with an embodiment of the invention. Referring to FIG. 1C, there is shown the CMOS chip 130 comprising the CMOS chip surface 137, and the CMOS guard ring 141. There is also shown a fiber-to-chip coupler 143, an optical fiber cable 145, and an optical source assembly 147.

The CMOS chip 130 comprising the electronic devices/circuits 131, the optical and optoelectronic devices 133, the light source interface 135, the CMOS chip surface 137, and the CMOS guard ring 141 may be as described with respect to FIG. 1B.

In an embodiment of the invention, the optical fiber cable may be affixed, via epoxy for example, to the CMOS chip surface 137. The fiber chip coupler 143 enables the physical coupling of the optical fiber cable 145 to the CMOS chip 130.

In an embodiment of the invention, the efficiency of receiver subsystems on the CMOS chip 130 may be increased by utilizing an optical power combiner to efficiently combine optical signals of unknown phase and intensity in the photonic circuits in the CMOS chip 130. Other embodiments of the invention comprise a power equalizer, a polarization-insensitive combiner, a polarization controller, and a polarization-insensitive splitter.

In an exemplary embodiment of the invention, the integrated power may enable locating the CW laser source remotely, with the optical source signal communicated to the CMOS chip 130 via optical fiber, such as the optical fiber cable 145, as opposed to mounting the laser directly over a grating coupler in the light source module 147.

Figure 2:
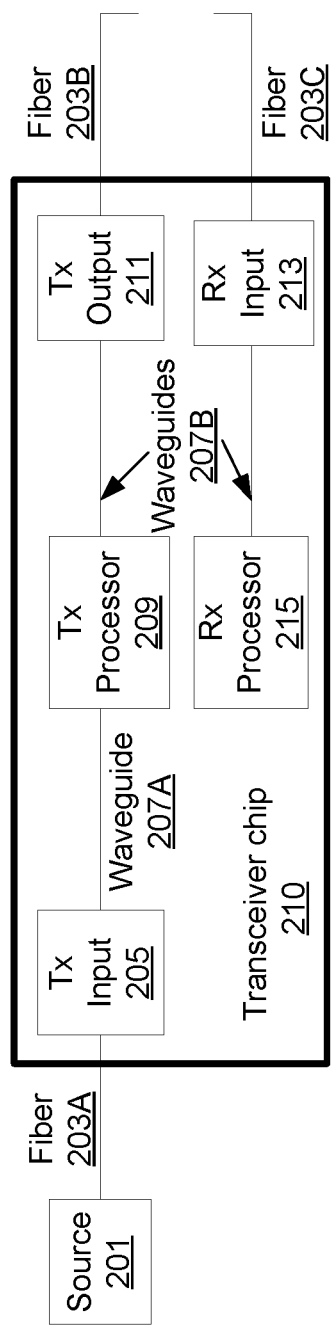
FIG. 2 is a block diagram of an exemplary integrated transceiver, in accordance with an embodiment of the invention.

FIG. 2 is a block diagram of an exemplary integrated transceiver, in accordance with an embodiment of the invention. Referring to FIG. 2, there is shown an optical source 201, optical fibers 203A-203C, and a transceiver chip 210 comprising a Tx input coupler 205, optical waveguides 207A and 207B, a Tx processor 209, a Tx output coupler 211, a Rx input coupler 213, and a Rx processor 215, The transceiver chip 210 may, for example, be substantially similar to the CMOS chip 130.

The source 201 may comprise a continuous wave (CW) optical source, such as a semiconductor laser, for example, that may provide an optical signal for the photonic circuitry in the transceiver chip 210. The Tx input coupler 205, the Tx output coupler 211, and the Rx input coupler 213 may comprise grating couplers, for example, that may be operable to couple light signals into and/or out of the transceiver chip to and/or from the optical fibers 203A-203C. The optical fibers 203A-203C may comprise single-mode, polarization-maintaining, or other type of optical fiber.

The Tx processor 209 may comprise a signal processor that may be operable to modulate a CW optical signal utilizing an electrical signal to enable the communication of data from the transceiver chip 210 via the Tx output coupler 211 and the fiber 203B. The Tx processor 209 may comprise optical modulators and associated control circuitry, for example, such as the optical modulators 105A-105D, the control sections 112A-112D, and the control circuits 109. The Tx processor 209 may also comprise an optical wavelength multiplexer.

Similarly, the Rx processor 215 may be substantially similar to the Tx processor 209, but operable to de-modulate optical signals received by the transceiver chip 210 via the optical fiber 203C and the Rx input coupler 213 and extract electrical signals. The Rx processor 215 may comprise one or more photodetectors to convert a received optical signal to an electrical signal. The Rx processor 215 may also comprise an optical wavelength demultiplexer.

Figure 3:
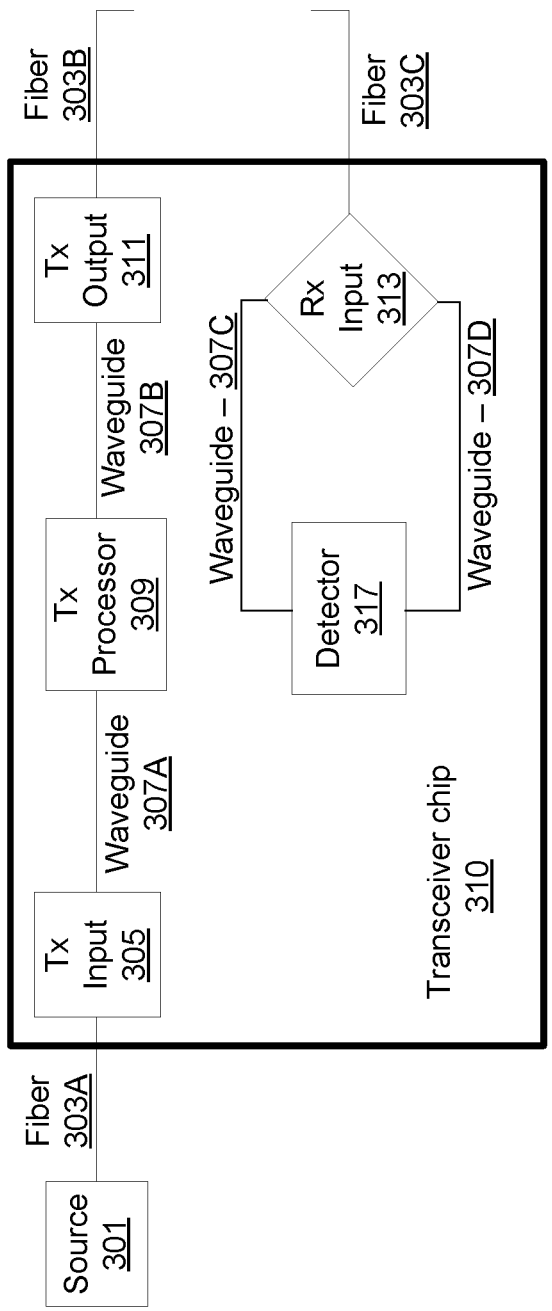
FIG. 3 is a block diagram of an exemplary integrated transceiver with a polarization splitting function, in accordance with an embodiment of the invention.

FIG. 3 is a block diagram of an exemplary integrated transceiver with a polarization splitting function, in accordance with an embodiment of the invention. Referring to FIG. 3, there is shown an optical source 301, optical fibers 303A-303C, and a transceiver chip 310 comprising a Tx input coupler 305, optical waveguides 307A-307D, a Tx processor 309, a Tx output coupler 311, a Rx input coupler 313, and a detector 317. The transceiver chip 310 may be substantially similar to the CMOS chip 130.

If the receiver signal processing function comprises simply the detecting an optical signal, as illustrated in FIG. 3, an exemplary embodiment comprises a polarization splitter function to the Rx input port. In this embodiment, a light signal with an arbitrary polarization state in the optical fiber 303C is split into two separate optical waveguides 307C and 307D and is combined at the detector 317. The Rx input coupler 313 may comprise a polarization-splitting grating coupler (PSGC). The intensity and phase of the light in each waveguide 307C and 307D is thus a function of the input polarization state into the transceiver chip 310 via the fiber 303C.

The Tx input coupler 305, the waveguides 307A-307D, the Tx processor 309, and the Tx output coupler 311, for example, may be substantially similar to the corresponding elements described with respect to FIG. 2. The detector 317 may, for example, be substantially similar to the photodetectors 111A-111D, described with respect to FIG. 1A.

Figure 4:
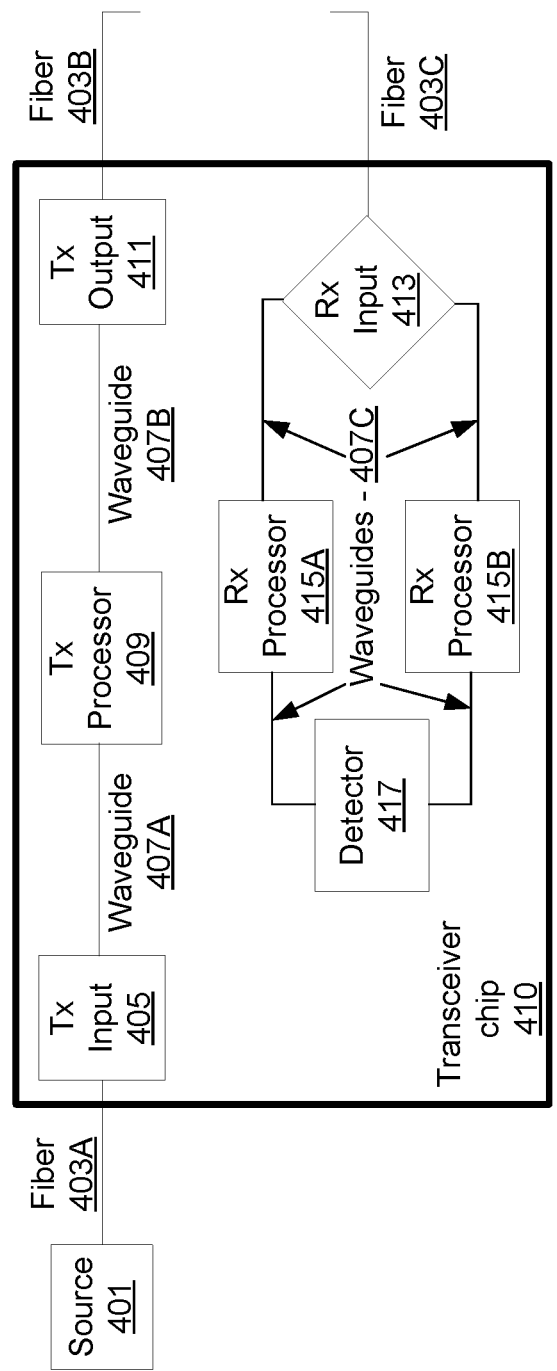
FIG. 4 is a block diagram of exemplary integrated transceiver with duplicate signal processors, in accordance with an embodiment of the invention.

In instances where additional signal processing is required before detection, such as optical monitoring or demultiplexing, then each signal processing element would be duplicated for each optical path, the optical waveguides 307C and 307D, as shown in FIG. 4.

FIG. 4 is a block diagram of exemplary integrated transceiver with duplicate signal processors, in accordance with an embodiment of the invention. The transceiver chip 410 may, for example, be substantially similar to the transceiver chip 310, described with respect to FIG. 3, but with the Rx processors 415A and 415B, which may, for example, be substantially similar to the Rx processor 315, described with respect to FIG. 3. Thus, circuit complexity and power usage may be reduced by combining the signals in each path before communicating them to a single Rx processor.

Similarly, at the transmitter input, if the fiber 403A connecting the light source 401 to the Tx input coupler 405 is single-mode, then light may be split into two waveguides, such that the Tx signal processor 409 would be duplicated, and the signals recombined before or at the transmitter output. Thus, circuit complexity could be further reduced both on the transmitter side and on the receiver side, with an opto-electronic circuit that combines the optical power from the outputs of the PSGCs efficiently.

Figure 5:
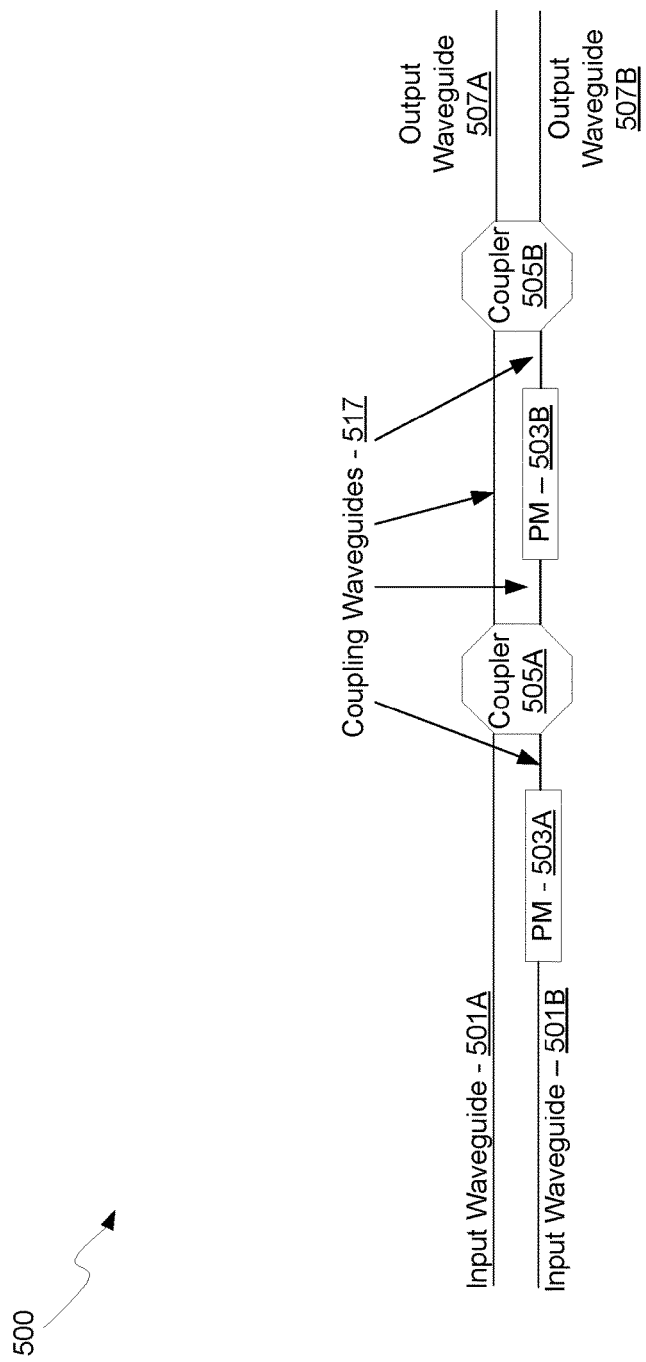
FIG. 5 is a block diagram of an exemplary optical power combiner, in accordance with an embodiment of the invention.

FIG. 5 is a block diagram of an exemplary optical power combiner, in accordance with an embodiment of the invention. Referring to FIG. 5, there is shown an optical power combiner 500 comprising input waveguides 501A and 501B, phase modulators 503A and 503B, optical couplers 505A and 505B, coupling waveguides 517, and output waveguides 507A and 507B. The optical couplers 505A and 505B may be directional couplers, or multi-mode interference couplers, for example, and may exhibit a tapping ratio of approximately 50%, for example. The directional couplers may comprise a multi-stage directional coupler comprising a plurality of directional couplers cascaded in series. The coupling waveguides 517 may be operable to communicate optical signals between the couplers 505A and 505B and the phase modulators 503A and 503B.

The phase and the intensity in the two output waveguides emanating from a PSGC is unknown since it depends on the polarization state in the fiber, so the light from the waveguides may not be combined passively, such as physically joining the waveguides side-by-side. This would violate the physical principle known as the brightness theorem. Therefore, in an embodiment of the invention, the optical power combiner 500 exhibits adaptive control to achieve an in-phase combination of the two input signals regardless of the polarization state of the incoming light in the input waveguides 501A and 501B.

In an embodiment of the invention, the optical power combiner 500 combines light from the two input waveguides 501A and 501B into a single output waveguide, given arbitrary intensity and amplitude in the two input waveguides. The output may be from either the output waveguide 507A or 507B.

In an embodiment of the invention, the phase modulators may be adaptively adjusted to maximize the power in one of the output waveguides 507A and 507B for any input polarization state. Consequently, the signal is substantially extinguished in the alternate output waveguide. The amplitude of the light signal in input waveguides 501A and 501B may be considered the two components of a vector (within a phase factor) as $$A\begin{pmatrix} \cos\theta \\ e^{i\phi}\sin\theta \end{pmatrix}$$

If the phase modulator 503A imparts a phase shift $e^{-i\phi}$ in the input waveguide 501B relative to the input waveguide 501A, then before the coupler 505A, the amplitude in the waveguides will be $$A\begin{pmatrix} \cos\theta \\ \sin\theta \end{pmatrix}$$

within a phase factor. After the coupler 505A, the amplitudes become $$\frac{A}{\sqrt{2}}\begin{pmatrix} e^{i\theta} \\ ie^{-i\theta} \end{pmatrix}$$

with equal power in both arms. If now the phase modulator 503B imparts a phase shift $e^{2i\theta}$ to the bottom waveguide, then before the coupler 505B, the amplitudes will be $$\frac{A}{\sqrt{2}}\begin{pmatrix} 1 \\ i \end{pmatrix}$$

within a phase factor. After the coupler 505B, we obtain $$iA\begin{pmatrix} 0 \\ 1 \end{pmatrix}$$

Since, depending on their design, the phase modulators 503A and 503B normally provide only positive or only negative phase shifts efficiently, it may be desirable to insert additional phase modulators into the waveguides in each stage.

Figure 6:
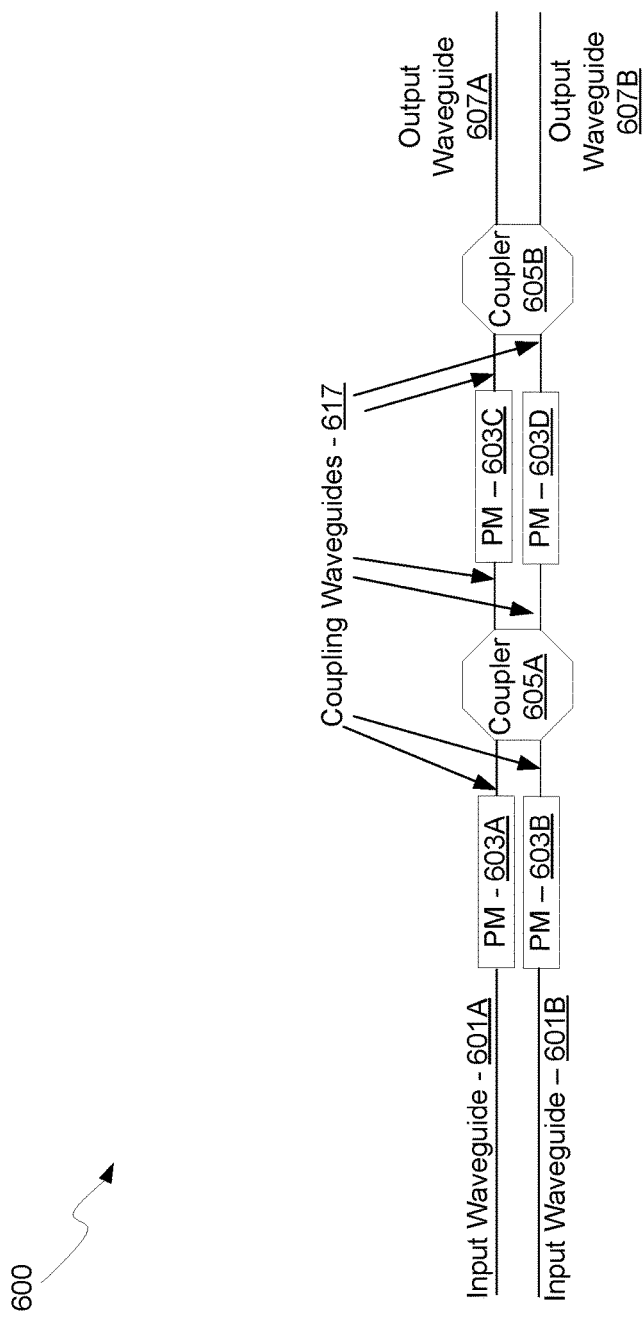
FIG. 6 is a block diagram of an exemplary optical power combiner with phase modulators in each waveguide stage, in accordance with an embodiment of the invention.

FIG. 6 is a block diagram of an exemplary optical power combiner with phase modulators in each waveguide stage, in accordance with an embodiment of the invention. Referring to FIG. 6, there is shown an optical power combiner 600 comprising input waveguides 601A and 601B, phase modulators 603A and 603B, optical couplers 605A and 605B, coupling waveguides 617, and output waveguides 607A and 607B. The optical couplers 605A and 605B may be directional couplers, or multi-mode interference couplers, for example, and may exhibit a tapping ratio of approximately 50%, for example. The optical power combiner 600 may, for example, be substantially similar to the optical power combiner 500 but with phase modulators in each waveguide stage. The coupling waveguides 617 may be operable to communicate optical signals between the couplers 605A and 605B and the phase modulators 603A-603D.

Figure 7:
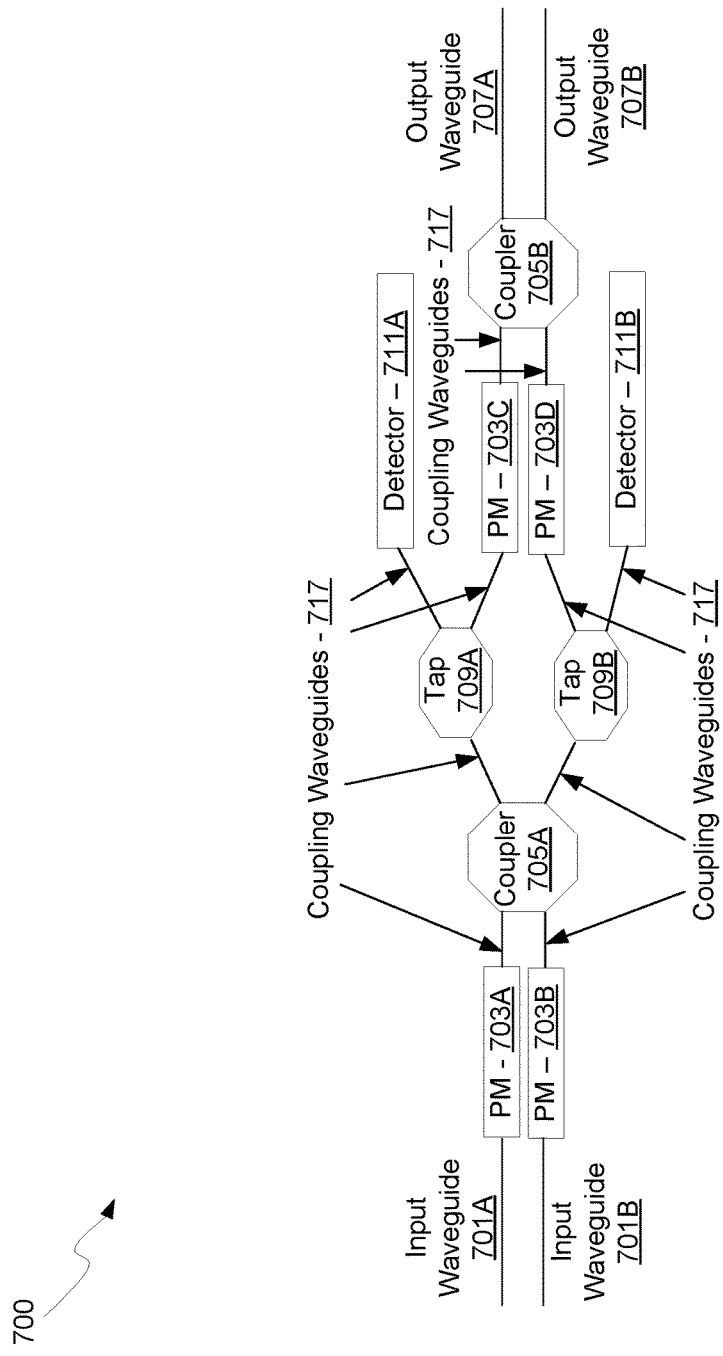
FIG. 7 is a block diagram of an exemplary optical power combiner with phase modulators and power detection in each waveguide stage, in accordance with an embodiment of the invention.

The optical power combiner 600 may be controlled, for instance, by using power monitors that tap some portion of the light off from both waveguides into detectors to monitor the signals, as illustrated further with respect to FIG. 7. The phase modulators 603A and 603B may be configured so that the power detected in each path following the coupler 605A is approximately equal. The phase modulators 603C and 603D may then be configured by maximizing the power in the desired output waveguide 607A or 607B.

In another embodiment of the invention, the optical power combiner 600 may comprise a plurality of stages, with each stage comprising pairs of phase modulators/couplers. This may enable a larger capacity to correct for unknown polarization fluctuations and uneven power splitting in the optical couplers.

FIG. 7 is a block diagram of an exemplary optical power combiner with phase modulators and power detection in each waveguide stage, in accordance with an embodiment of the invention. Referring to FIG. 7, there is shown an optical power combiner 700 comprising input waveguides 701A and 701B, phase modulators 703A and 703B, optical couplers 705A and 705B, output waveguides 707A and 707B, taps 709A and 709B, coupling waveguides 717, and power detectors 711A and 711B. The optical couplers 705A and 705B may be directional couplers, or multi-mode interference couplers, for example, and may exhibit a tapping ratio of approximately 50%, for example. The optical power combiner 700 may, for example, be substantially similar than the optical power combiner 600 but with phase modulators in each waveguide stage. The coupling waveguides 717 may be operable to communicate optical signals between the couplers 705A and 705B, the phase modulators 703A-703D, the taps 709A and 709B, and the detectors 711A and 711B.

The taps 709A and 709B may, for example, be substantially similar to the taps 103A-103K described with respect to FIG. 1A, and may be operable to tap optical power from the optical signals received from the coupler 705A such that a measurement of the optical power may be measured and still allow most of the optical signal to pass to the phase modulators 703C and 703D. The power detectors 711A and 171B may comprise photodetectors, for example, that may be operable to detect the magnitude of optical signals received from the taps 709A and 709B.

The optical power combiner 700 may be controlled by using the taps 709A and 709B to tap a portion of the light off from both waveguides into the detectors 711A and 711B to monitor the signals. The phase modulators 703A and 703B may be configured so that the power detected in each path following the coupler 705A is approximately equal. The phase modulators 703C and 703D may then be configured by maximizing the power in the desired output waveguide 707A or 707B.

The combiner 700 may be part of a larger subsystem that also includes the control electronics used for monitoring the tapped signal and controlling the amount of phase shift in each phase modulator. The control electronics may be either external to the transceiver chip or integrated monolithically on the chip.

Figure 8:
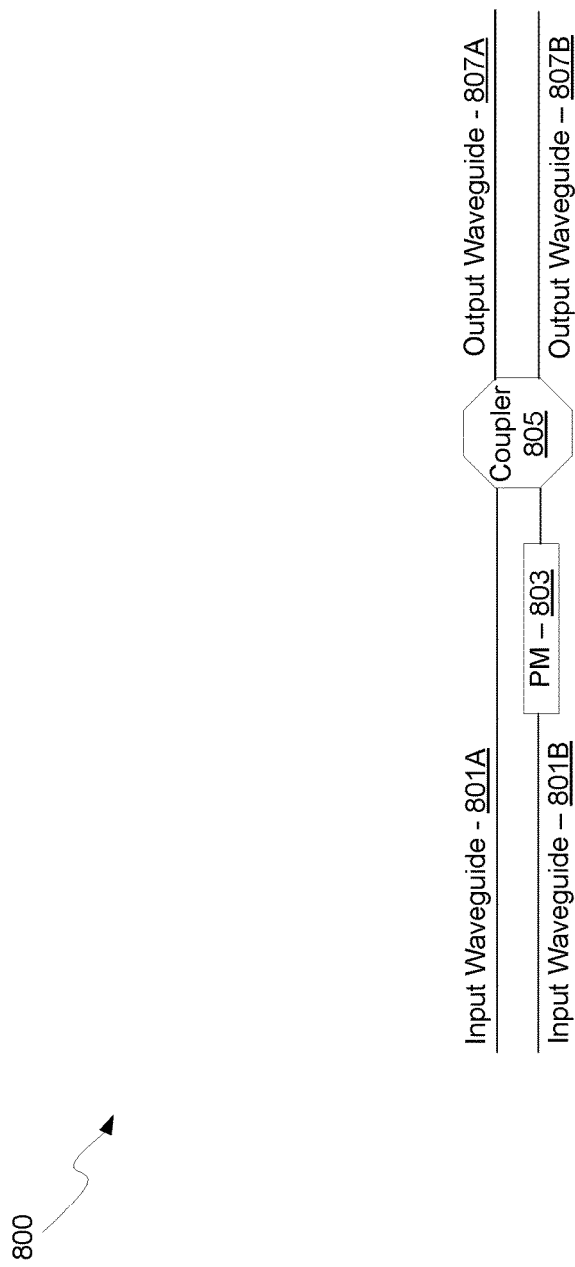
FIG. 8 is a block diagram of an exemplary power equalizer, in accordance with an embodiment of the invention.

FIG. 8 is a block diagram of an exemplary power equalizer, in accordance with an embodiment of the invention. Referring to FIG. 8, there is shown an optical power equalizer 800 comprising input waveguides 801A and 801B, a phase modulator 803, an optical coupler 805, and output waveguides 807A and 807B.

In certain applications, it is beneficial to distribute light equally between two waveguides, given a power imbalance between the two. The power equalizer 800 is substantially the first stage of an exemplary power combiner device, such as described with respect to FIG. 5, for example, and comprises two input waveguides 801A and 801B, a phase modulator 803, a coupler 805, and two output waveguides 807A and 807B.

In an embodiment of the invention, if the amplitudes of the light signal in waveguides 801A and 801B are written as $$A\begin{pmatrix} \cos\theta \\ e^{i\phi}\sin\theta \end{pmatrix}$$

then configuring the phase modulator 803 to impart a phase shift $e^{-i\phi}$ in the input waveguide 801B relative to the waveguide 801A, the amplitude in the waveguides before the coupler 805 will be $$A\begin{pmatrix} \cos\theta \\ \sin\theta \end{pmatrix}$$

within a phase factor. After the coupler 805, the amplitudes become $$\frac{A}{\sqrt{2}}\begin{pmatrix} e^{i\theta} \\ ie^{-i\theta} \end{pmatrix}$$

Writing the amplitudes in terms of optical power, $$\frac{A^2}{2}\begin{pmatrix} 1 \\ 1 \end{pmatrix}$$

that is, the powers in the output waveguides 807A and 807B are thus equal. As in the case of the power combiners 600 and 700, the optical power equalizer 800 may be augmented with an additional phase modulator in the alternate input waveguide, a control system with taps and monitors, and control electronics.

Figure 9:
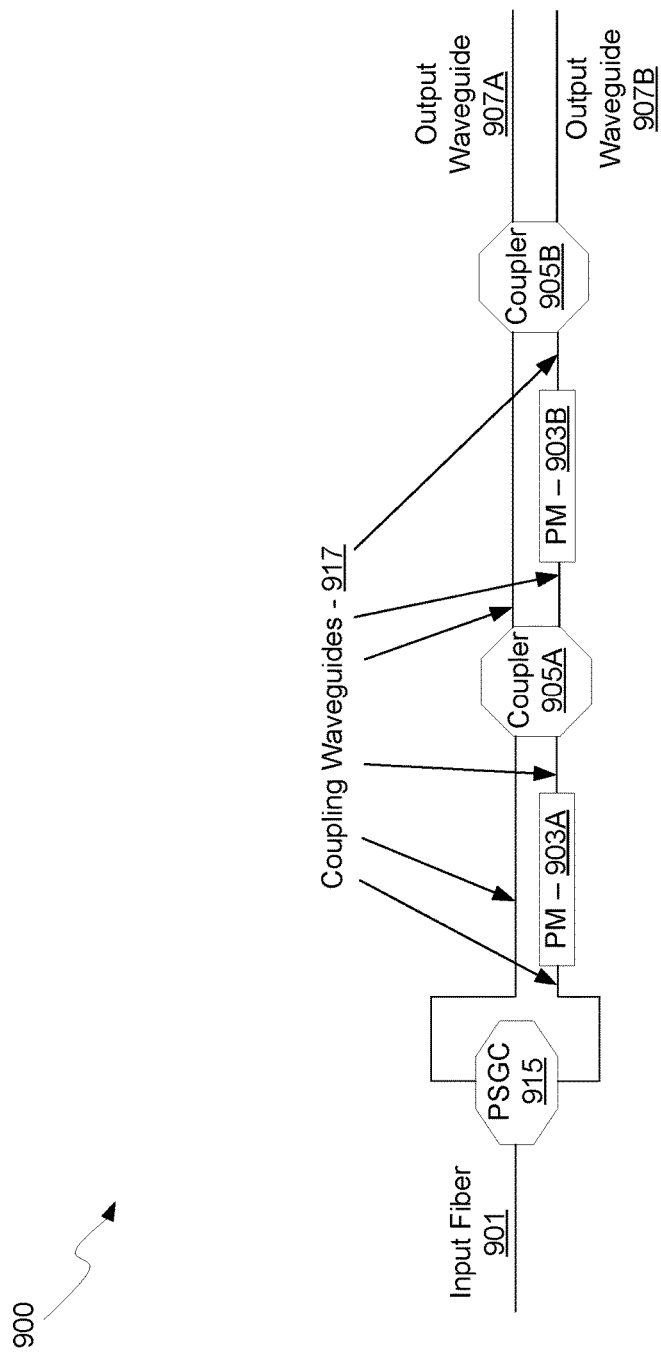
FIG. 9 is a block diagram of a polarization-insensitive combiner, in accordance with an embodiment of the invention.

FIG. 9 is a block diagram of a polarization-insensitive combiner, in accordance with an embodiment of the invention. Referring to FIG. 9, there is shown a polarization-insensitive combiner 900 comprising an input fiber 901, a polarization-splitting grating coupler 915, phase modulators 903A and 903B, optical couplers 905A and 905B, coupling waveguides 917, and output waveguides 907A and 907B. The coupling waveguides 917 may be operable to communicate optical signals between the couplers 905A and 905B, the polarization splitting grating coupler 915, and the phase modulators 903A and 903B.

In an exemplary embodiment of the invention, the polarization-insensitive combiner 900 combines light from an arbitrary polarization state in the fiber 901 into a single waveguide on the transceiver chip, either output waveguide 907A and 907B depending on the control of the phase modulators 903A and 903B, thereby reducing the complexity of other opto-electronic circuits on the chip.

The polarization-splitting grating coupler 915 accepts light from the input fiber 901. Light with an arbitrary polarization is redirected into the two output waveguides of the polarization-splitting grating coupler 915, where the two signals can have an arbitrary phase and amplitude relationship. Using the combiner described with respect to FIG. 5 following the polarization-splitting grating coupler 915, the power is combined into a single output waveguide, either the waveguide 907A or 907B. The polarization-splitting grating coupler 915 may be replaced with any device having the functionality of a polarization splitter.

Controlling the phase modulators 903A and 903B may be achieved by maximizing the signal in the output waveguide, 907A or 907B, or minimizing the signal in the alternate waveguide. As in the case of the power combiner, the polarization-insensitive combiner 900 may be combined with an additional phase modulator in the alternate waveguides, a control system with taps and monitors, and control electronics. Furthermore, utilizing the polarization-insensitive combiner 900 at the transmitter input port allows connecting the CW light source to the transceiver chip using a single-mode fiber instead of a polarization-maintaining fiber, and on the receiver side, the polarization-insensitive combiner 900 used as the input port obviates the need for duplicating the signal processing circuits on the receiver.

Figure 10:
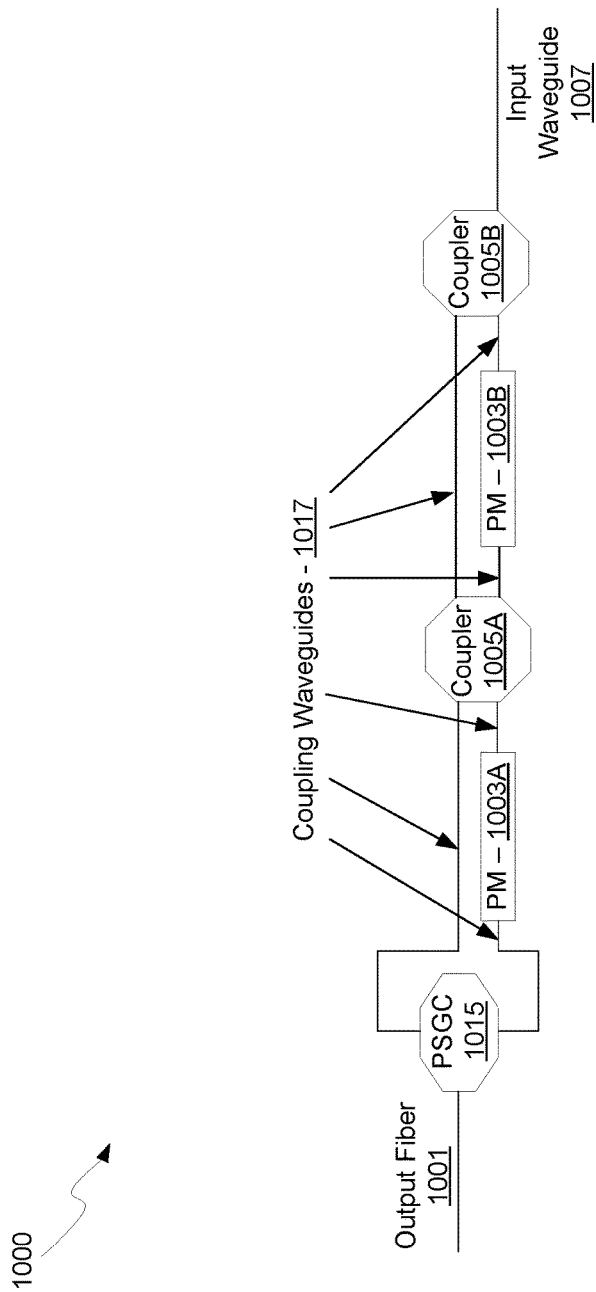
FIG. 10 is a block diagram of a polarization controller, in accordance with an embodiment of the invention.

FIG. 10 is a block diagram of a polarization controller, in accordance with an embodiment of the invention. Referring to FIG. 10, there is shown a polarization controller 1000 comprising an input fiber 1001, a polarization-splitting grating coupler 1015, phase modulators 1003A and 1003B, optical couplers 1005A and 1005B, coupling waveguides 1017, and an output waveguide 1007. The coupling waveguides 1017 may be operable to communicate optical signals between the couplers 1005A and 1005B, the polarization splitting grating coupler 1015, and the phase modulators 1003A and 1003B.

The polarization controller 1000 may substantially comprise the polarization-insensitive combiner 900 operating in reverse, such that it may be used to launch light into a fiber or waveguide in any desired polarization state. The input waveguide 1007 receives the optical signal coming from the rest of the opto-electronic circuit on the chip. By adjusting the two phase modulators 1003A and 1003B, an arbitrary polarization state may be generated in the output fiber 1001. As in the case of the power combiners, the polarization controller 1000 may be combined with an additional phase modulator in the alternate waveguides, a control system with taps and monitors, and control electronics.

In another embodiment of the invention, the optical polarization controller 1000 may comprise a plurality of stages, with each stage comprising pairs of phase modulators/couplers. This may enable a larger capacity to correct for unknown polarization fluctuations and uneven power splitting in the optical couplers.

Figure 11:
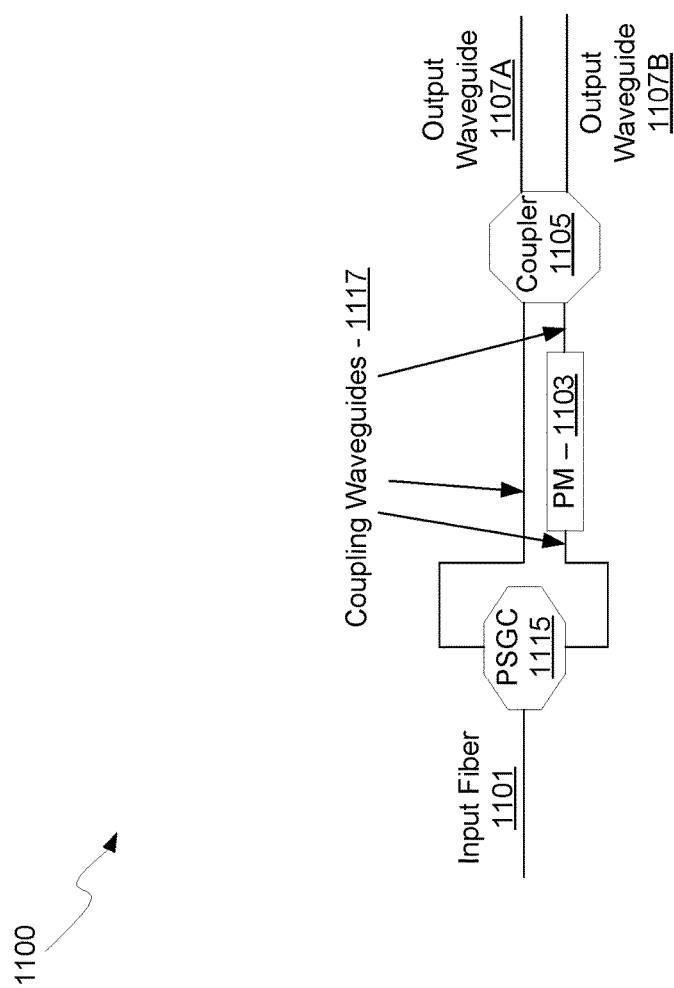
FIG. 11 is a block diagram of a polarization-insensitive splitter, in accordance with an embodiment of the invention.

FIG. 11 is a block diagram of a polarization-insensitive splitter, in accordance with an embodiment of the invention. Referring to FIG. 11, there is shown a polarization controller 1100 comprising an input fiber 1101, a polarization-splitting grating coupler 1115, a phase modulator 1103, an optical coupler 1105, coupling waveguides 1117, and output waveguides 1107A and 1107B. The coupling waveguides 1117 may be operable to communicate optical signals between the coupler 1105, the polarization splitting grating coupler 1115, and the phase modulator 1103.

In multi-channel parallel transceiver architectures, power from the light source is typically split between several channels. For a two-channel system, the CW light coupled onto the chip is split evenly between the two channels before it enters the modulators. In an exemplary embodiment of the invention, the first stage of the polarization-insensitive combiner 1100 may be utilized to achieve this functionality.

As described with respect to the power combiners, the phase modulator 803 may be adjusted so that the powers in the output waveguides 1107A and 1107B are substantially equal for an arbitrary input polarization of light in the fiber. In addition, as in the case of the power combiner, the polarization-insensitive combiner 1100 may be combined with an additional phase modulator in the alternate waveguide, a control system with taps and monitors, and control electronics.

In another embodiment of the invention, the polarization-insensitive combiner 1100 may also be used in a transmitter with more than two channels. For instance, in a four-channel device, the polarization insensitive combiner and splitter may be followed by a passive splitter to further subdivide the incoming CW light into four, with each pair of outputs being controlled to output equal powers via phase modulation adjustments. And in yet another embodiment of the invention, the polarization-insensitive combiner 1100 may also be used in the receiver of quadrature demodulation systems where light is split evenly between two waveguides after it is received from a fiber.

In an embodiment of the invention, a method and system are disclosed for a chip 130, 210, 310, 410 comprising an optical power combiner 500, 600, 700 in a photonic circuit 133, the optical power combiner 500, 600, 700 comprising input optical waveguides 501A, 501B, 601A, 601B, 701A, 701B, optical couplers 505A, 505B, 603A-603D, 705A, 705B, and output optical waveguides 507A, 507B, 607A, 607B, 707A, 707B. Optical signals may be received in each of the input optical waveguides 501A, 501B, 601A, 601B, 701A, 701B and phase-modulated to configure a phase offset between signals received at a first optical coupler 505A, 605A, 705A, where the first optical coupler 505A, 605A, 705A, may generate output signals having substantially equal optical powers. One or both output signals of the first optical coupler 505A, 605A, 705A may be phase-modulated to configure a phase offset between signals received at a second optical coupler 505B, 605B, 705B, where the second optical coupler 505B, 605B, 705B generates an output signal in a first of the output optical waveguides 507A, 507B, 607A, 607B, 707A, 707B having an optical power of essentially zero and an output signal in a second of the output optical waveguides 507A, 507B, 607A, 607B, 707A, 707B having a maximized optical power. The optical couplers 505A, 505B, 605A, 605B, 705A, 705B may comprise grating couplers, for example, and the chip may comprise, for example, a CMOS chip 130. Optical signals received by the input optical waveguides 501A, 501B, 601A, 601B, 701A, 701B may be generated utilizing a polarization-splitting grating coupler 313, 413, 915, 1015, 1115, where the polarization splitting grating coupler enables polarization-insensitive combining of optical signals utilizing the optical power combiner 500, 600. Optical power in waveguides 517, 617 coupling the optical couplers 505A, 505B, 605A, 605B, 705A, 705B may be monitored using optical detectors 711A, 711B. The monitoring of optical power may be used to determine a desired phase offset between the signals received at the first optical coupler 505A, 605A, 705A, and optical signals may be communicated to the optical detectors 711A, 711B utilizing optical taps 709A, 709B in the coupling waveguides 517, 617, 717.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A system for processing optical signals, the system comprising:
a chip comprising a polarization insensitive splitter, said splitter comprising an input optical waveguide, an optical coupler, and a polarization-splitting grating coupler, said chip being operable to:
generate two output signals from said polarization-splitting grating coupler that receives an input signal from said input optical waveguide;
phase modulate one or both of said two output signals to configure a phase offset between said two generated output signals before communicating signals with said phase offset to said optical coupler; and
launch output optical signals of a desired intensity into output waveguides via said optical coupler by combining said signals communicated to said optical coupler.

2. The system according to claim 1, wherein said optical coupler comprises a directional coupler.

3. The system according to claim 1, wherein said optical coupler comprises a multi-mode interference coupler.

4. The system according to claim 1, wherein said optical coupler comprises a multi-stage cascaded directional coupler.

5. The system according to claim 1, wherein said chip comprises a CMOS chip.

6. The system according to claim 1, wherein said chip is operable to monitor optical power in waveguides coupling said polarization splitting grating coupler to said optical coupler using optical detectors, wherein said monitoring of optical power is used to determine a desired phase offset between said signals received at said optical coupler.

7. The system according to claim 6, wherein said chip is operable to communicate optical signals to said optical detectors utilizing optical taps in said coupling waveguides.

8. The system according to claim 1, wherein said polarization insensitive splitter comprises a plurality of stages.

9. A method for processing optical signals, the method comprising:
in a chip comprising a polarization insensitive splitter, said splitter comprising an input optical fiber, two output waveguides, an optical coupler, and a polarization-splitting grating coupler:
generating two output signals from said polarization-splitting grating coupler that receives an input signal from said input optical fiber;
phase modulating one or both of said two output signals to configure a phase offset between said two generated output signals before communicating signals with said phase offset to said optical coupler; and
launching optical signals of desired intensities into said output waveguides via said optical coupler.

10. The method according to claim 9, wherein said optical coupler comprises a directional coupler.

11. The method according to claim 9, wherein said optical coupler comprises a multi-mode interference coupler.

12. The method according to claim 9, wherein said optical coupler comprises a multi-stage cascaded directional coupler.

13. The method according to claim 9, wherein said chip comprises a CMOS chip.

14. The method according to claim 9, comprising monitoring optical power in waveguides coupling said polarization splitting grating coupler to said optical coupler using optical detectors, wherein said monitoring of optical power is used to determine a desired phase offset between said signals received at said optical coupler.

15. The method according to claim 9, wherein said polarization insensitive splitter comprises a plurality of stages.

16. The method according to claim 9, wherein said polarization insensitive splitter comprises a single stage.

17. A system for processing optical signals, the system comprising:
a chip comprising a polarization insensitive splitter, said polarization insensitive splitter comprising an input optical waveguide, an optical coupler, and a polarization-splitting grating coupler, said chip being operable to:
generate two output signals from said polarization splitting grating coupler that receives an input signal from said input optical waveguide;
phase modulate one or both of said two output signals to configure a phase offset between said two generated output signals before communicating signals with said phase offset to said optical coupler; and
launch an optical signal of a desired intensity into an optical fiber via said optical coupler.

18. The system according to claim 17, wherein said chip is operable to monitor optical power in waveguides coupling said polarization splitting grating coupler to said optical coupler using optical detectors, wherein said monitoring of optical power is used to determine a desired phase offset between said signals received at said optical coupler.

19. The system according to claim 18, wherein said chip is operable to communicate optical signals to said optical detectors utilizing optical taps in said coupling waveguides.

20. The system according to claim 17, wherein said polarization insensitive splitter comprises a plurality of stages.

* * * * *